(12) United States Patent
Obata et al.

(10) Patent No.: US 7,137,129 B2
(45) Date of Patent: Nov. 14, 2006

(54) DISK DRIVE APPARATUS

(75) Inventors: Manabu Obata, Kanagawa (JP);
Mitsunori Matsumura, Tokyo (JP);
Zensaku Mitsuji, Kanagawa (JP);
Hideaki Tsutsumi, Tokyo (JP); Hisashi Negoro, Chiba (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 10/818,804

(22) Filed: Apr. 5, 2004

(65) Prior Publication Data
US 2004/0255310 A1 Dec. 16, 2004

(30) Foreign Application Priority Data
Apr. 8, 2003 (JP) ............................. 2003-103803

(51) Int. Cl.
*G11B 17/03* (2006.01)
(52) U.S. Cl. .................................... 720/604
(58) Field of Classification Search ................ 720/604, 720/600, 601, 632, 706, 713
See application file for complete search history.

(56) References Cited

U.S. PATENT DOCUMENTS 5,590,113 A * 12/1996 Choi .......................... 720/713
6,650,603 B1 * 11/2003 Michimori et al. ...... 369/30.82
6,954,935 B1 * 10/2005 Niikura et al. ............. 720/604

* cited by examiner

*Primary Examiner*—Allen Cao
(74) *Attorney, Agent, or Firm*—Oblon, Spivak, McClelland, Maier & Neustadt, P.C.

(57) ABSTRACT

A disk drive apparatus includes a casing having an upper plate; and a tray. The upper plate includes an arm having an attracted member fixed thereto. When the tray moves from a protruding position to a recording-and-playback position, since engagements of the arm and the tray are engaged with each other, the main body of the arm swings, and the attracted member serves as a chucking position facing a chucked portion of the disk-shaped recording medium placed on the tray. When the tray moves from the recording-and-playback position to the protruding position, since the engagement of the arm is detached from the engagement of the tray, the main body of the arm swings, and the attracted member serves as a retracting position retracting above the chucked portion of the disk-shaped recording medium.

5 Claims, 12 Drawing Sheets

DISK DRIVE APPARATUS

BACKGROUND OF THE INVENTION

1. Field of the Invention

The present invention relates to a disk drive apparatus recording information into and/or playing it back from a disc-shaped recording medium.

2. Description of the Related Art

Hitherto, an optical disk, such as a compact disk (CD) or a digital versatile disk (DVD), used in a pair disk state has been available on the market. Also, a disk cartridge having a structure in which an optical disk is stored in a cartridge case such that both faces of the optical disk are covered by the cartridge case has been available on the market.

As disclosed in, for example, U.S. Published Application No. 2004-0013071, a disk drive apparatus recording information into and/or playing it back from any both an optical disk in a pair disk state and another optical disk stored in the cartridge case has been available on the market.

In such a disk drive apparatus, when an optical disk used in a pair disk state is used, the optical disk is chucked such that a chucked portion of the optical disk is sandwiched by a magnet built in a turntable of a spindle motor and an attracted member attracted to the magnet.

When a disk cartridge is used, an optical disk in the disk cartridge is chucked such that an attracted plate built in the chucked portion of the optical disk is attracted by the magnet built in the turntable.

Also, when a disk cartridge is used, the disk drive apparatus has a mechanism by which the attracted member is moved to a retracting position lying in the back space in a direction along which the disk cartridge is loaded or unloaded in order to prevent the attracted member from interfering with the disk cartridge.

Since the above-described known apparatus has a mechanism by which the attracted member is moved to the retracting position lying in the back space of the apparatus in the direction along which the disk cartridge is loaded or unloaded in order to prevent the attracted member from interfering with the disk cartridge, it is required to secure a retracting space of the attracted member in the direction along which the disk cartridge is loaded or unloaded, thereby leading to a disadvantage in making the apparatus compact.

Also, as used, for example, in some of blue ray disks, when a disk cartridge having a structure in which a circular projection is formed along the circumference of an optical disk so as to extend higher than the upper surface of the optical disk in a state in which the optical disk is stored in a disk-storing depression in the upper surface of a cartridge case of the disk cartridge is used, the mechanism by which the attracted member is moved to the back space of the apparatus in the direction along which the disk cartridge is loaded or unloaded causes the attracted member to interfere with the circular projection of the cartridge case, thereby leading to a problem in that the disk cartridge having the above-mentioned structure can not be used.

SUMMARY OF THE INVENTION

The present invention has been made in view of the above-mentioned problems. Accordingly, it is an object of the present invention to provide a disk drive apparatus which is advantageously made compact and prevents an attracted member from interfering with a disk cartridge when it is loaded or unload.

In order to achieve the above object, a disk drive apparatus according to the present invention includes a casing; a tray on which a disk-shaped recording medium or a disk cartridge having a disk-shaped recording medium stored therein is placed and which moves between a recording-and-playback position drawn inside the casing and a protruding position withdrawn outside from the casing; at least one pickup disposed in the casing, recording information into and/or playing it back from the disk-shaped recording medium when the tray lies at the recording-and-playback position; and a chucking mechanism disposed in the casing, holding a chucked portion of the disk-shaped recording medium when the tray lies at the recording-and-playback position. The chucking mechanism includes a turntable on which the chucked portion of the disk-shaped recording medium is placed and which has a magnet built therein; and an attracted member facing the upper surface of the disk-shaped recording medium and attracted by the magnet when the tray lies at the recording-and-playback position. The disk drive apparatus further includes a rotational driver disposed in the casing, rotationally driving the disk-shaped recording medium held by the chucking mechanism; an arm disposed to a portion of the casing above the tray lying at the recording-and-playback position so as to be vertically swingable, supporting and moving the attracted member between a retracting position retracting above the chucked portion and a chucking position at which the attracted member faces the chucked portion; and an arm-swinging mechanism which swings the arm so as to cause the attracted member to move to the retracting position when the tray moves from the recording-and-playback position to the protruding position and which swings the arm so as to cause the attracted member to move from the retracting position to the chucking position when the tray moves from the protruding position to the recording-and-playback position.

With this structure, when the tray moves from the recording-and-playback position to the protruding position, the arm-swinging mechanism causes the attracted member to move to the retracting position retracting above the upper surface of the chucked portion of the disk-shaped recording medium, and, when the tray moves from the protruding position to the recording-and-playback position, the arm-swinging mechanism causes the attracted member to move to the chucking position facing the upper surface of the chucked portion.

Accordingly, on the occasion of loading or unloading the disk cartridge, the attracted member is prevented from interfering with a projected or depressed portion of the tray or the disk cartridge, and also no retracting space of the attracted member is needed in the direction along which the disk cartridge is loaded or unloaded.

As a result, according to the present invention, a disk drive apparatus which is advantageously made compact and prevents the attracted member from interfering with the disk cartridge on the occasion of loading or unloading the disk cartridge can be provided.

DESCRIPTION OF THE PREFERRED EMBODIMENTS

A disk drive apparatus according to an embodiment of the present invention will be described in accordance with the attached drawings.

Figure 1:
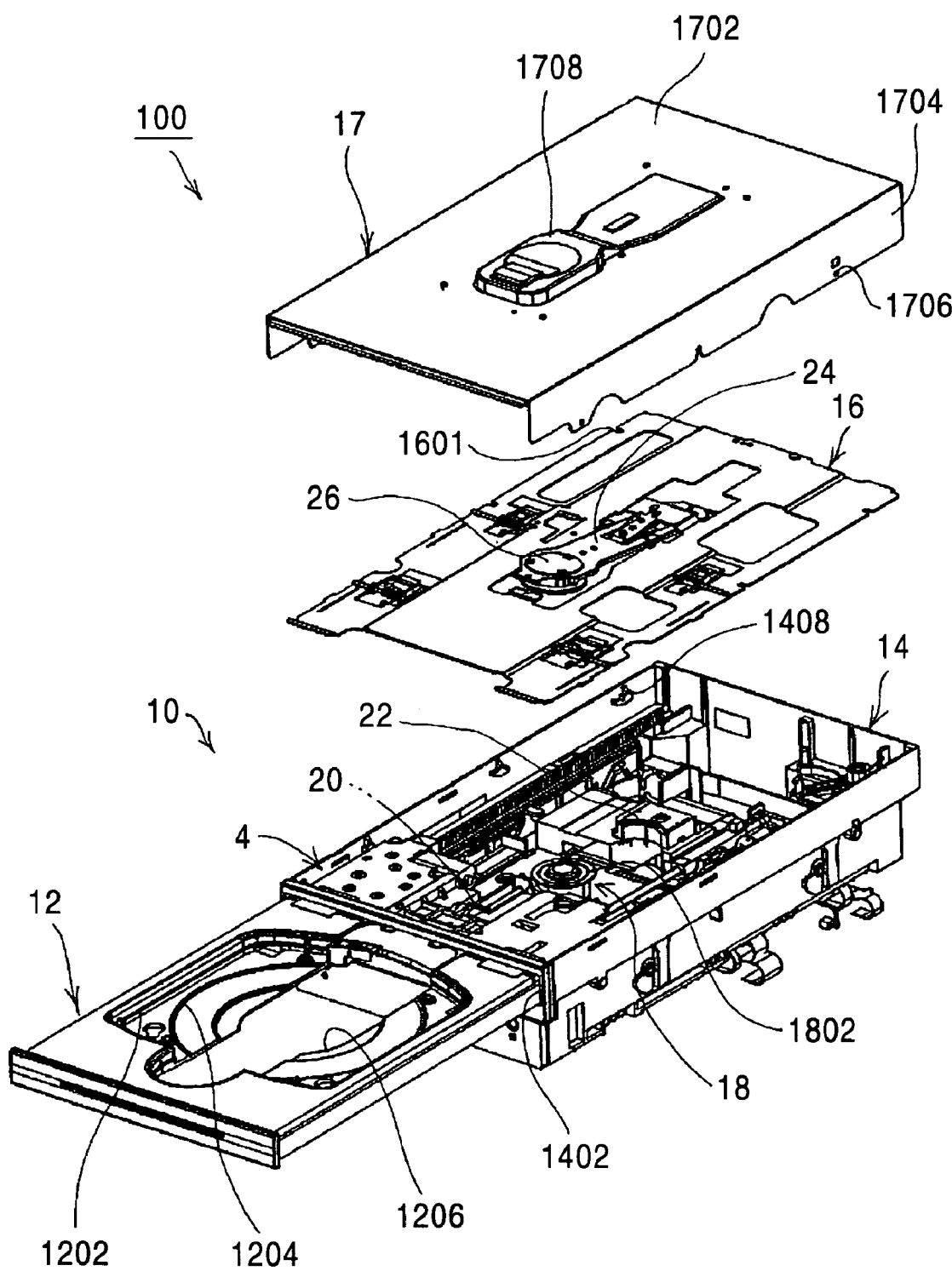
FIG. 1 is an exploded perspective view of a disk drive apparatus according to an embodiment of the present invention.
Figure 2:
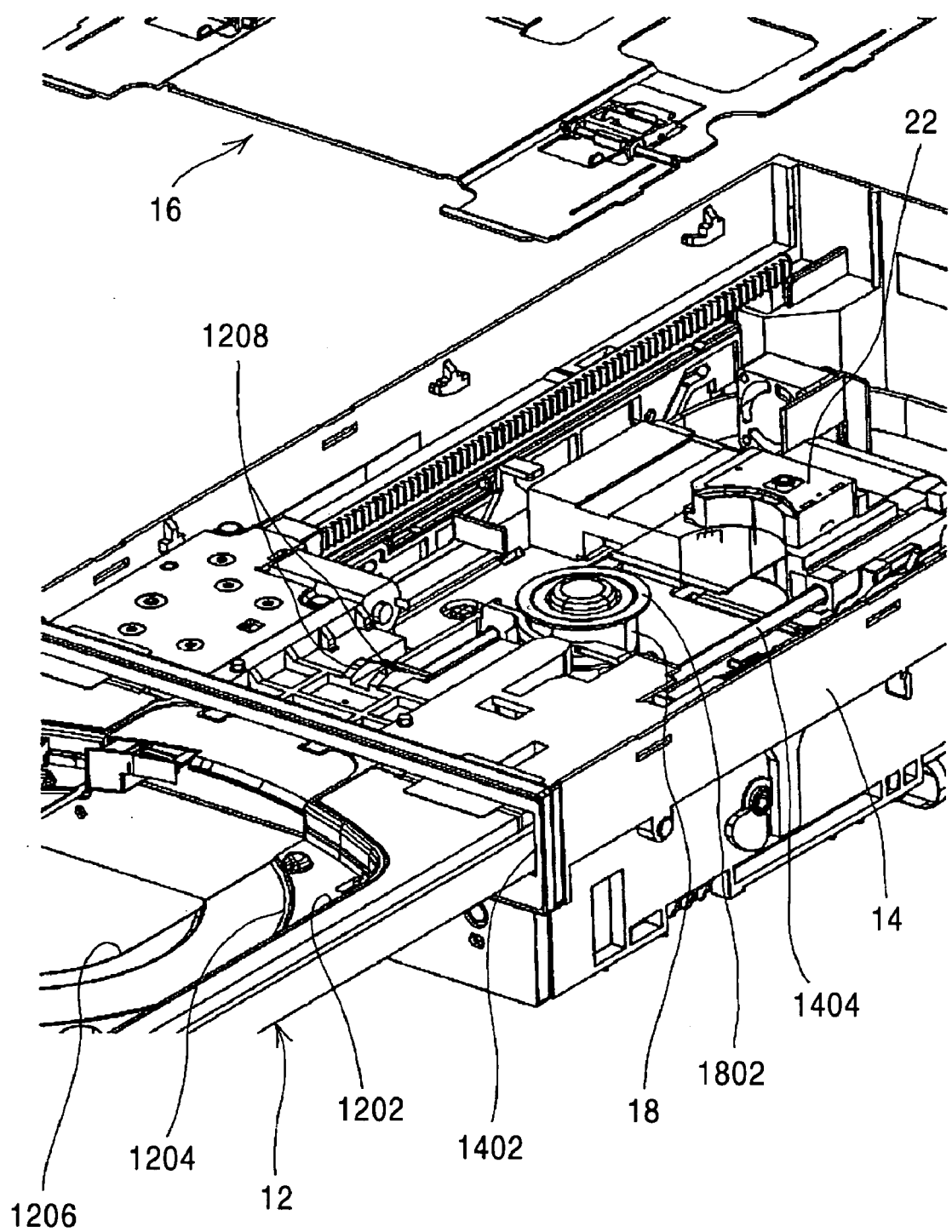
FIG. 2 is a partial perspective view of the main body of the disk drive apparatus.
Figure 3:
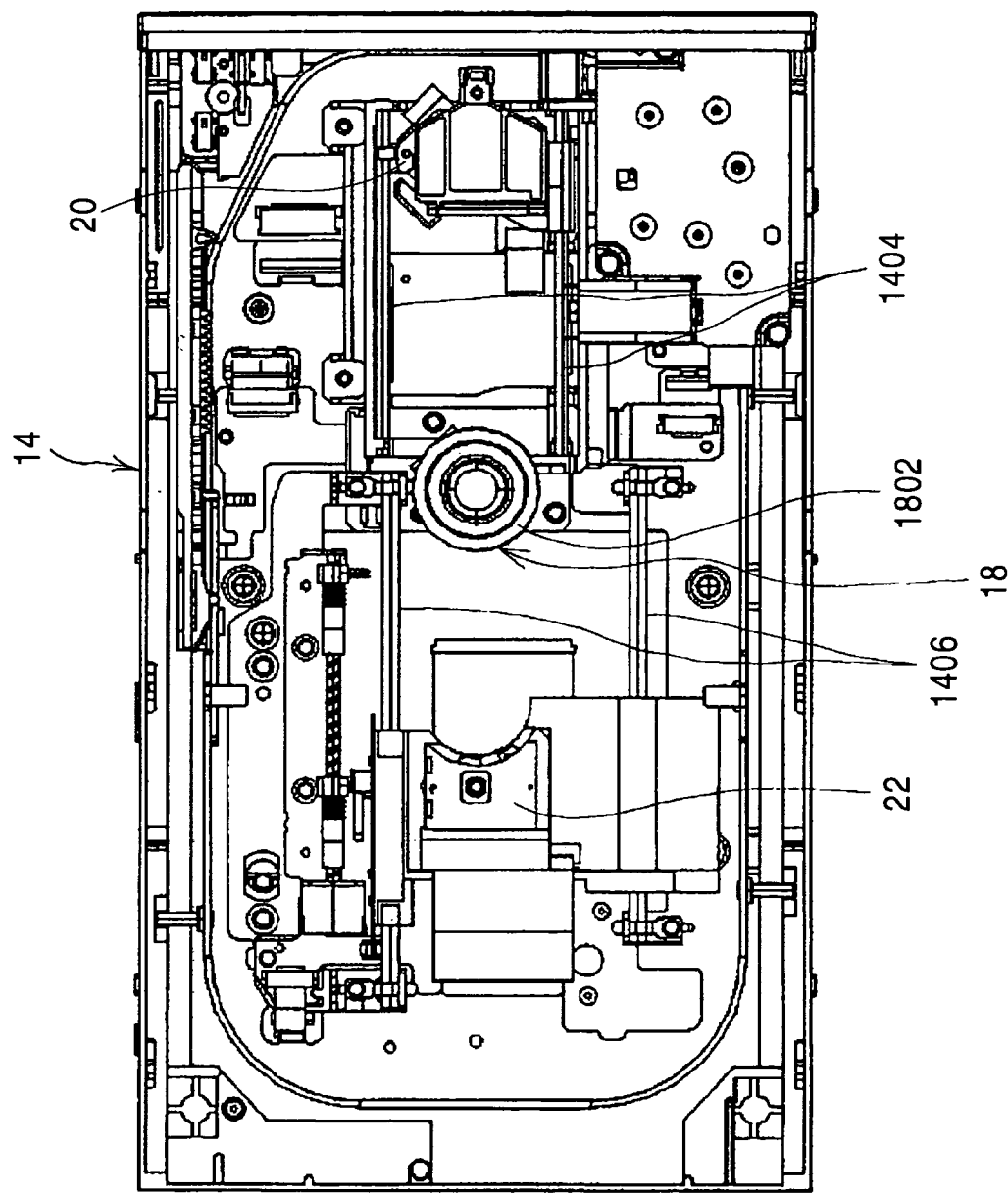
FIG. 3 is a plan view of the main body.
Figure 4:
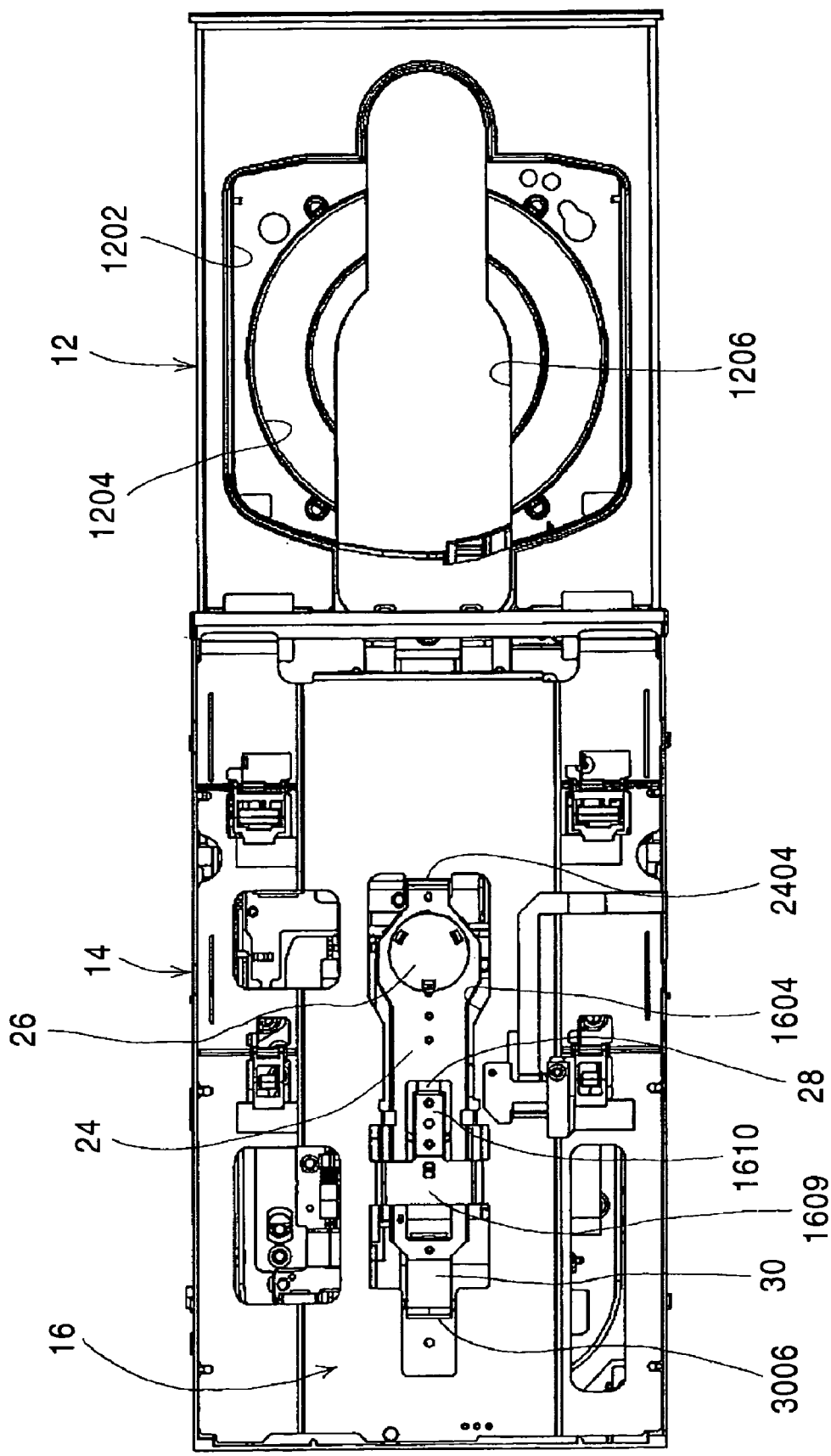
FIG. 4 is a plan view of the main body in a state in which a tray lies at a protruded position.
Figure 5:
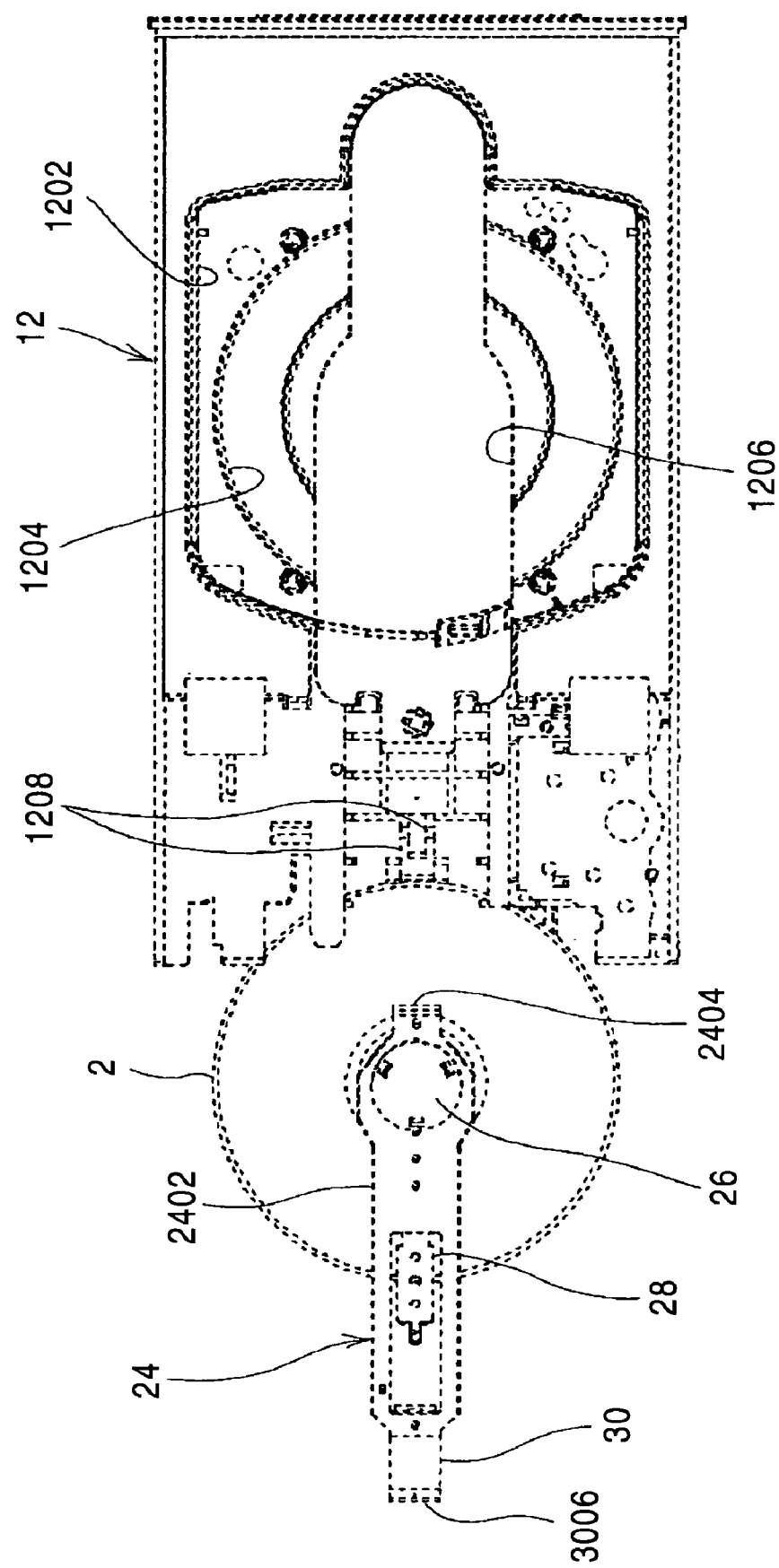
FIG. 5 illustrates the positional relationship among the tray, an arm, and an attracted member.
Figure 6:
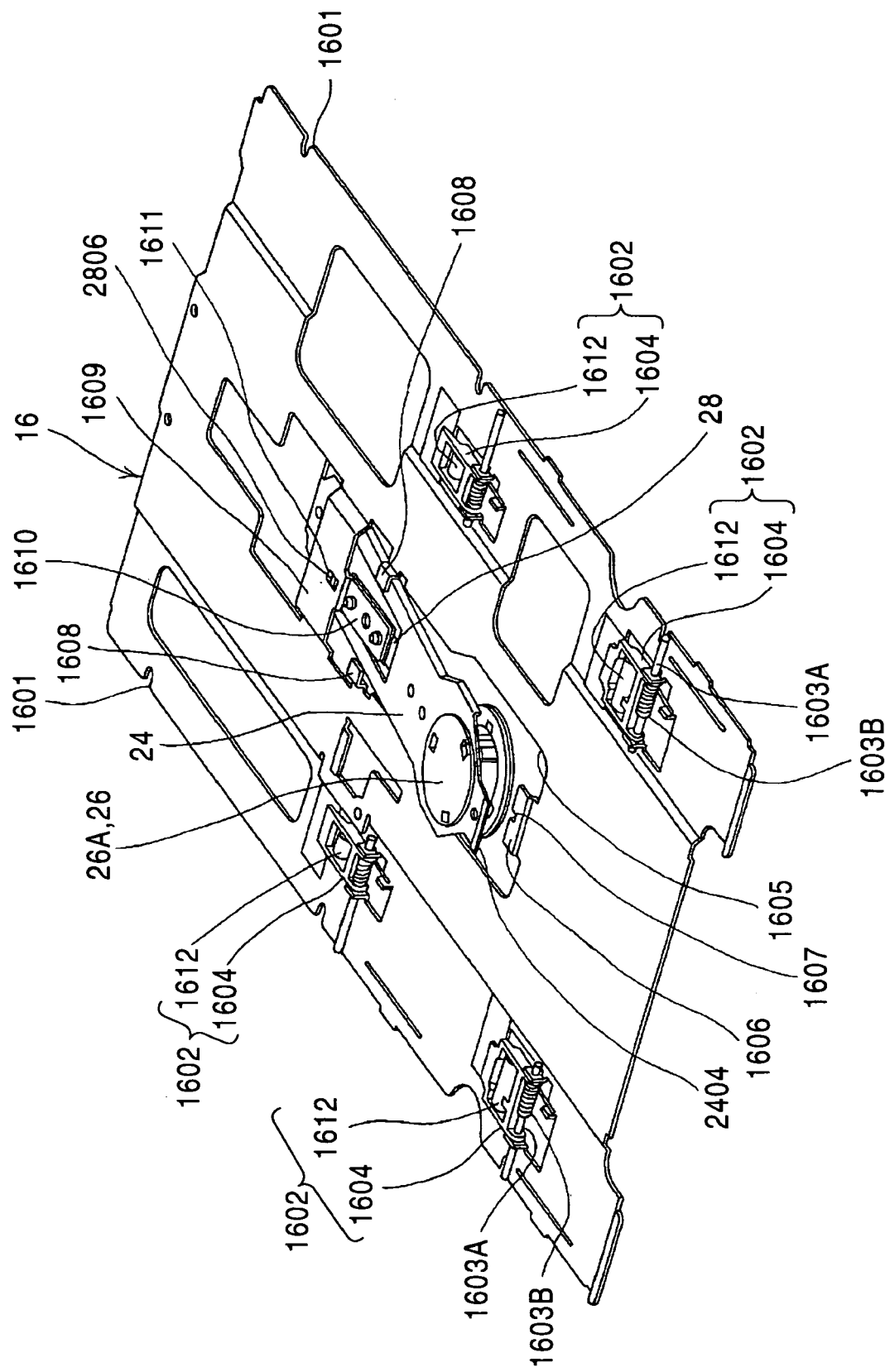
FIG. 6 is a perspective view of an upper plate.
Figure 7:
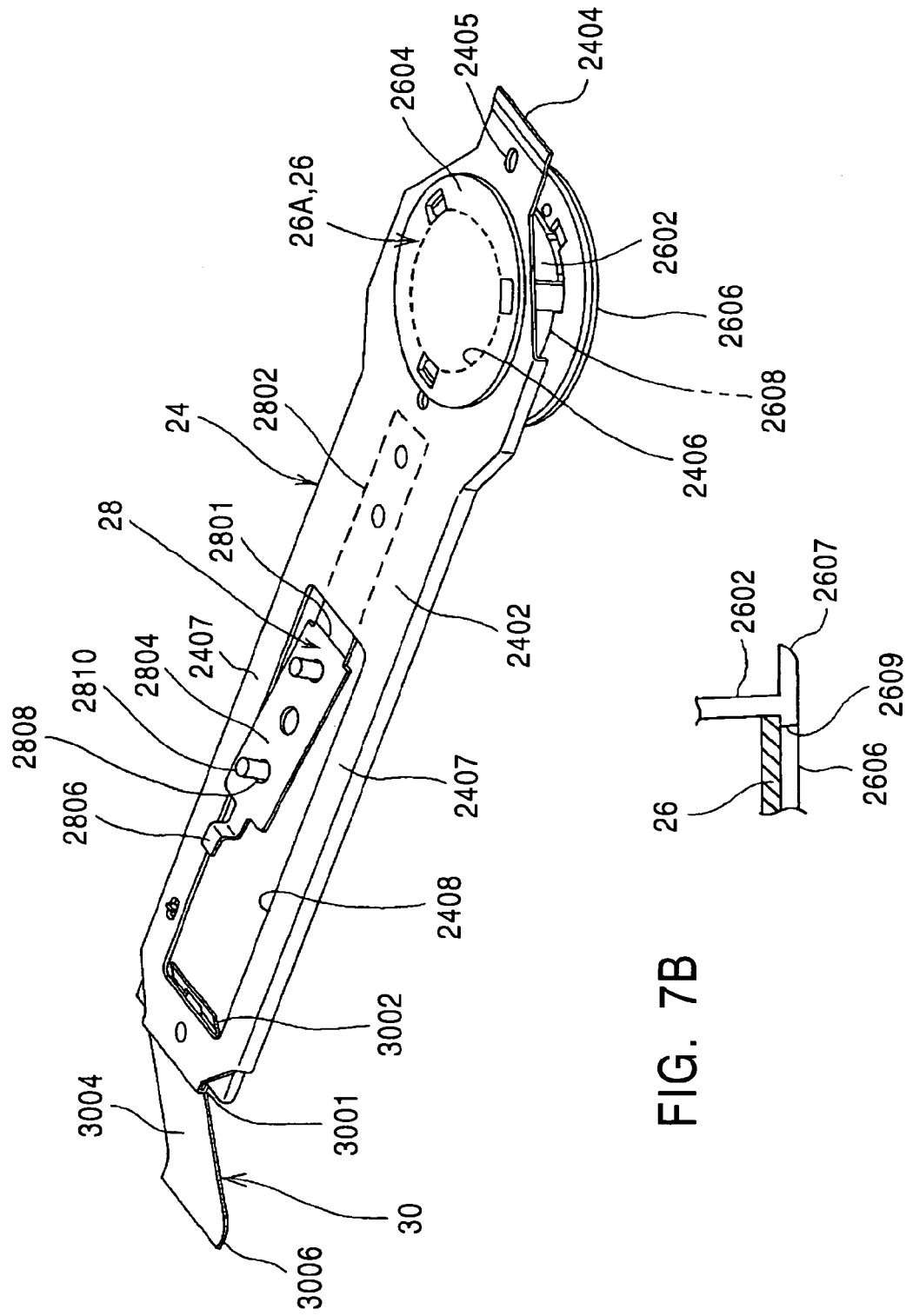
FIG. 7A is a perspective view of the arm and the attracted member.
FIG. 7B is a partial sectional view of the attracted member.
Figure 8:
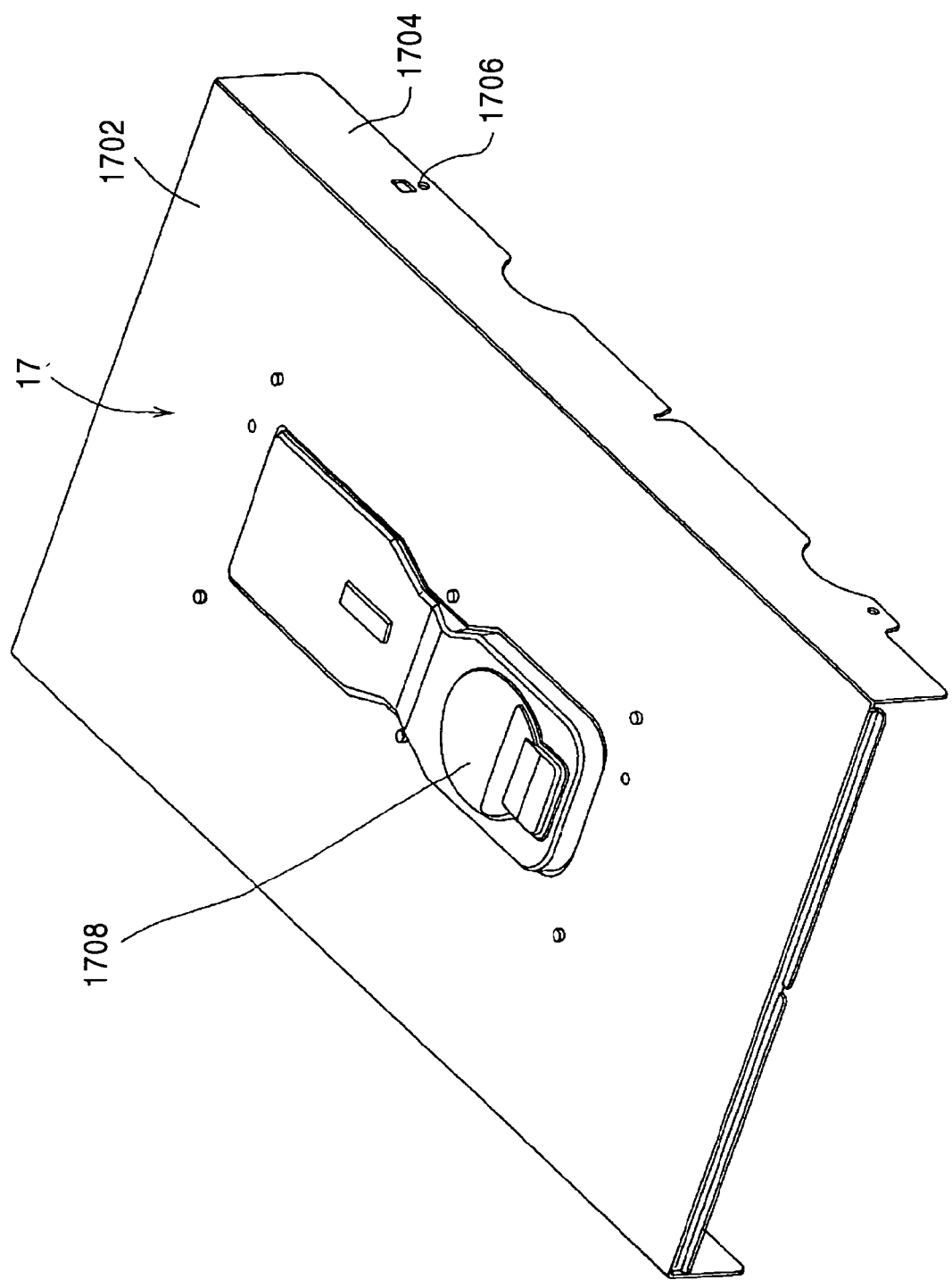
FIG. 8 is a perspective view of a cover.
Figure 9:
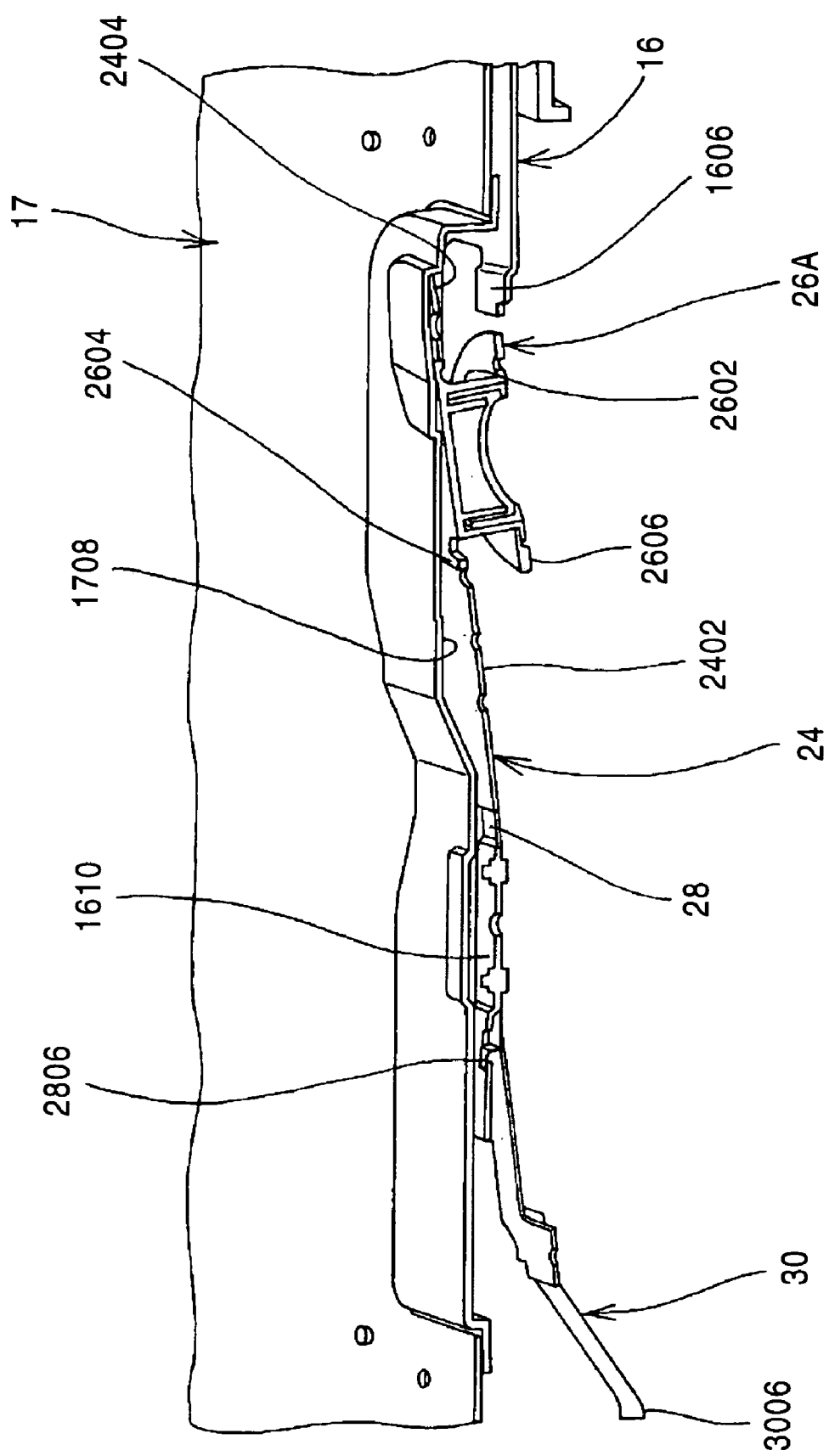
FIG. 9 is a partially broken perspective view of the cover, the arm, and the attracted member.
Figure 10:
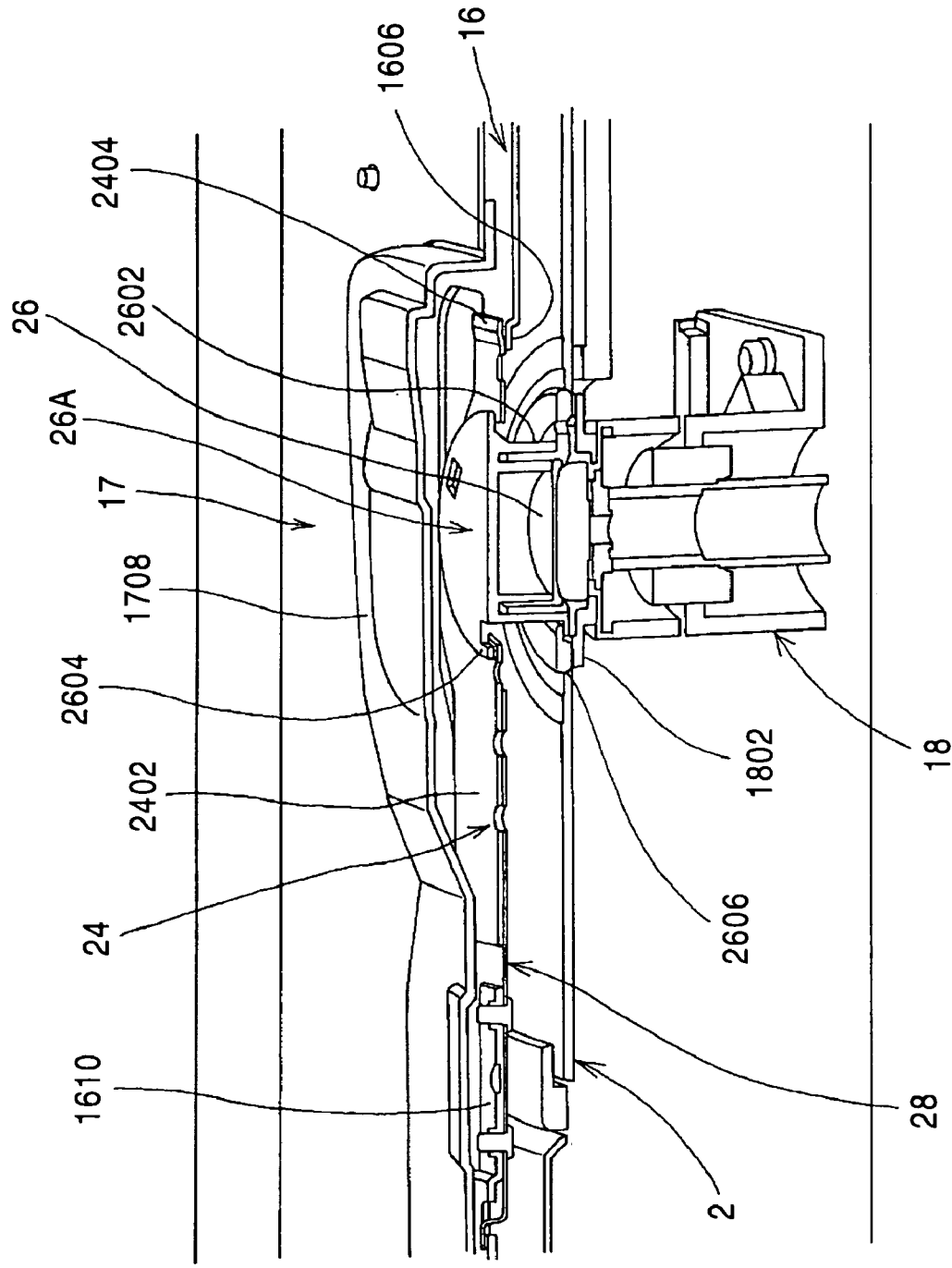
FIG. 10 is a sectional view of the disk drive apparatus in a state in which the attracted member lies at a chucking position.
Figure 11:
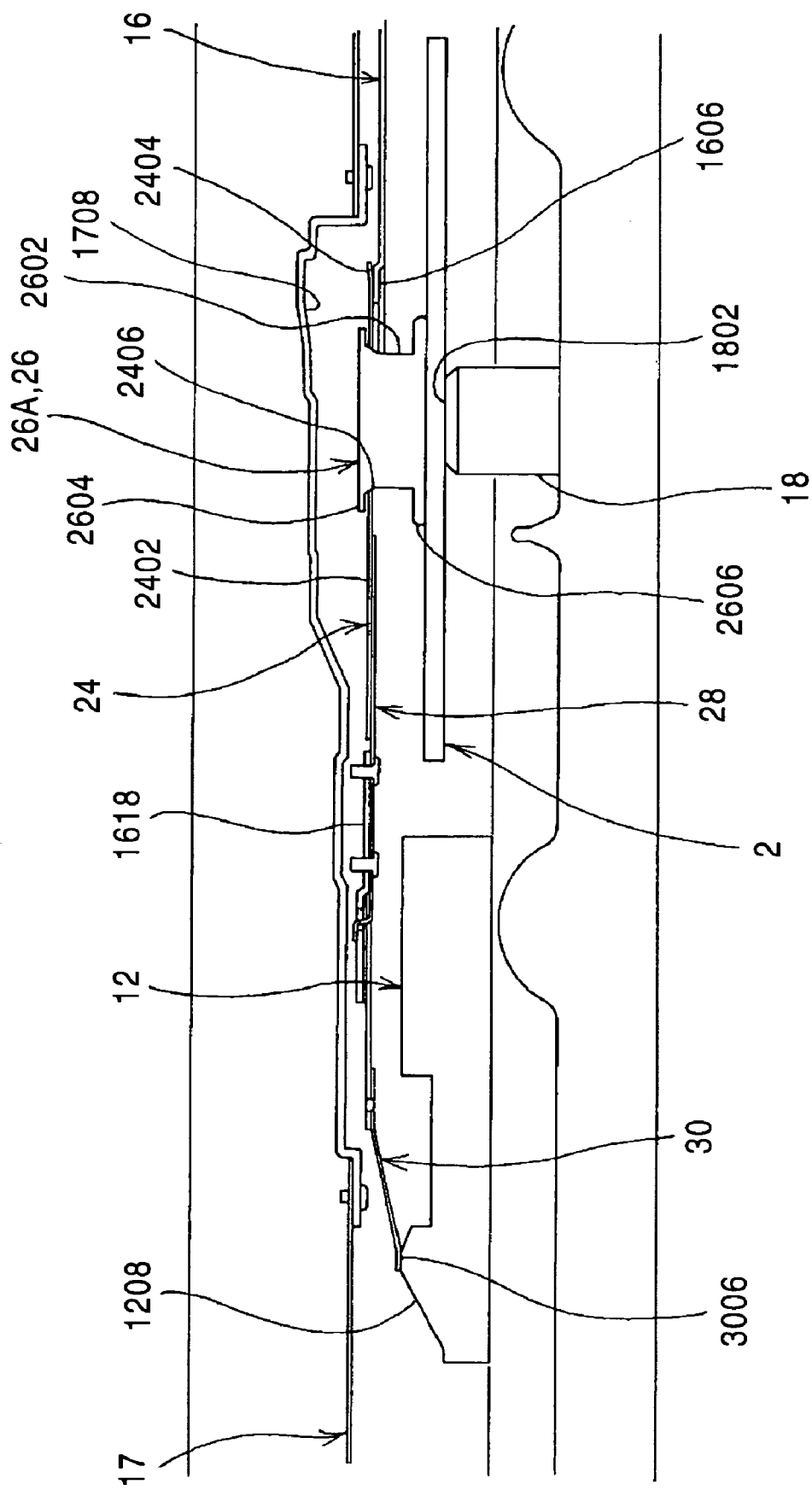
FIG. 11 is a partially broken perspective view of the cover, the arm, the attracted member, and a turntable.
Figure 12:
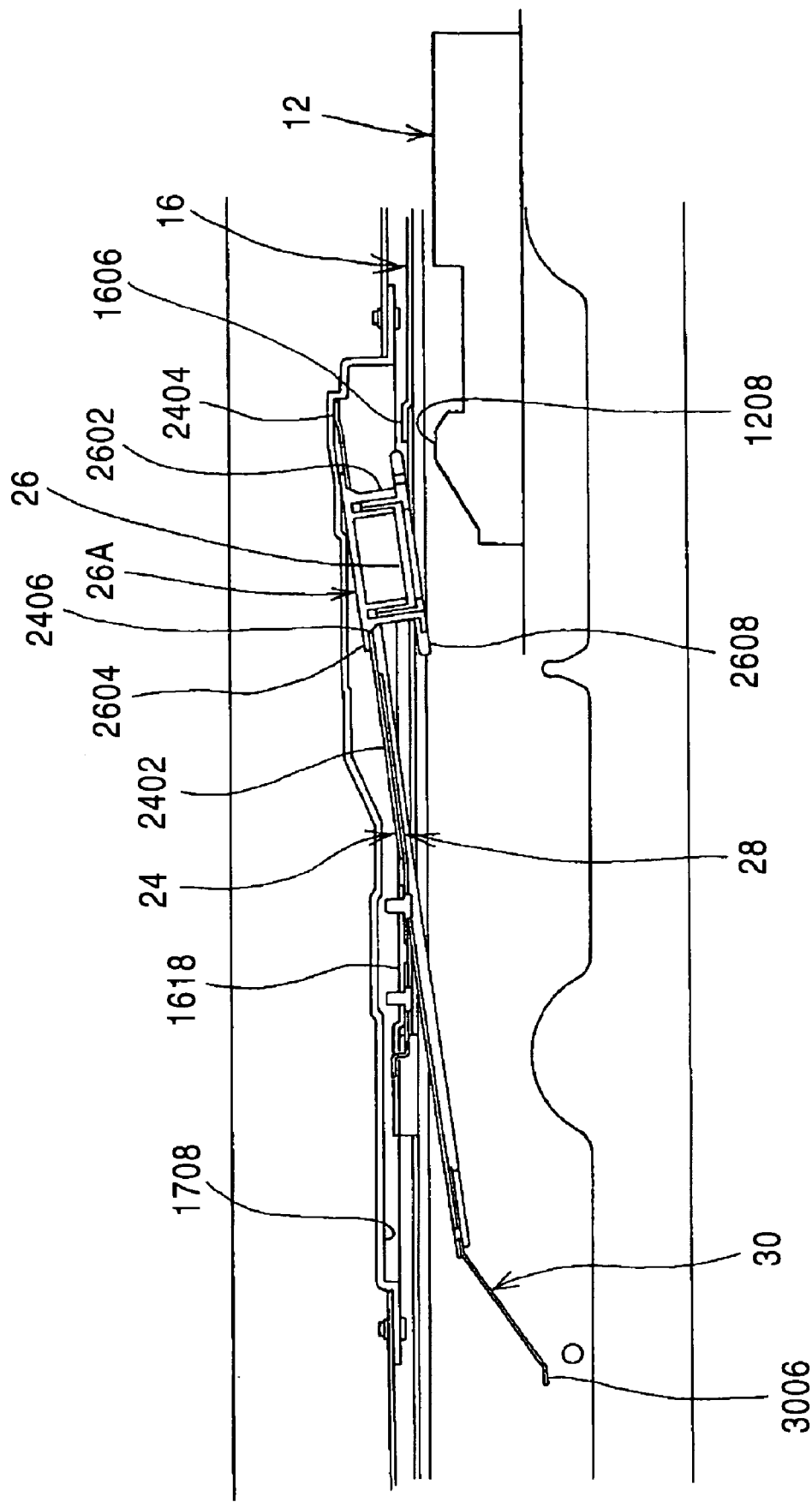
FIG. 12 is a sectional view of the disk drive apparatus in a state in which the attracted member lies at a retracting position.

FIG. 1 is an exploded perspective view of the disk drive apparatus according to the embodiment FIG. 2 is a partial perspective view of the main body of the disk drive apparatus; FIG. 3 is a plan view of the main body; FIG. 4 is a plan view of the main body in a state in which a tray lies at a protruding position; FIG. 5 illustrates the positional relationship among the tray, an arm, and an attracted member; FIG. 6 is a perspective view of an upper plate; FIG. 7A is a perspective view of the arm and the attracted member, FIG. 7B is a partial sectional view of the attracted member; FIG. 8 is a perspective view of a cover; FIG. 9 is a partially broken perspective view of the cover, the arm, and the attracted member; FIG. 10 is a sectional view of the disk drive apparatus in a state in which the attracted member lies at a chucking position; FIG. 11 is a partially broken perspective view of the cover, the arm, the attracted member, and a turntable; and FIG. 12 is a sectional view of the disk drive apparatus in a state in which the attracted member lies at a retracting position.

As shown in FIG. 1, a disk drive apparatus 100 includes a casing 10 and a tray 12 disposed so as to be movable outside and inside the casing 10.

The casing 10 has a rectangular plate-like shape longer in the back-and-forth direction than in the lateral direction.

The casing 10 has a main body 14 having a rectangular shape in plan view and being opened upwardly, an upper plate 16 covering the upper surface of the main body 14, and a cover 17 covering the upper plate 16.

The main body 14 has a rectangular bottom wall whose longitudinal direction lies in the back-and-forth direction, front and rear walls respectively erecting from the front and rear sides of the bottom wall, and two side walls erecting from the left and right sides of the bottom wall. The front wall has an opening 1402 through which the tray 12 is loaded or unloaded.

As shown in FIG. 3, the main body 14 has a spindle motor 18 disposed substantially in the center of the bottom wall, serving as a rotational driver for rotating a disk-shaped recording medium, and first and second pickups 20 and 22 disposed so as to have the spindle motor 18 interposed therebetween. The spindle motor 18, the first and second pickups 20 and 22 are arranged so as to be aligned in the back-and-forth direction of the main body 14, and the first and second pickups 20 and 22 lie in front of and in the back of the spindle motor 18, respectively.

As shown in FIG. 2, the spindle motor 18 has a rotating shaft, the rotating shaft has a flange-shaped turntable 1802, on which the lower surface of a chucked portion of the disk-shaped recording medium is placed, disposed at the top thereof so as to rotate together with the rotating shaft, and the turntable 1802 has a magnet built therein. Thus, in accordance with the vertical movement (movement along the axial direction) of the rotating shaft, the turntable 1802 moves between a lower retracting position lying away from the lower surface of the chucked portion of the disk-shaped recording medium placed on the tray and an upper chucking position abutting against the lower surface of the chucked portion.

As shown in FIG. 3, the first and second pickups 20 and 22 are disposed so as to be moveable in the back-and-forth direction along guide rails 1404 and 1406 extending in the back-and-forth direction, that is, to be moveable toward and away from the turntable 1802 and record information into and/or play it back from a disk-shaped recording medium when the tray 12 lies at a recording-and-playback position.

Each of the first and second pickups 20 and 22 includes a light source, a photoreceptor, an objective lens, and so forth. In the present embodiment, the first pickup 20 records information into and/or plays it back from a CD, a CD readable (CD-R), or a DVD by using laser light with wavelength of 650 nm or 680 nm, and the second pickup 22 records information into and/or plays it back from a high-density-recording digital video recorder (DVR: a blue ray disk) by using laser light with wavelength of 405 nm.

As shown in FIG. 1, the tray 12 has a rectangular plat-like shape extending longer in the back-and-forth direction than in the lateral direction. While passing through the opening 1402, the tray 12 is moved in the back-and-forth direction by drive and guide mechanisms (not shown) so as to reciprocate between the recording-and-playback position inside the casing 10 and a protruding position (see FIG. 4) lying outside the casing 10, at which a disk-shaped recording medium or a disk cartridge is loaded or unloaded.

The tray 12 has a first depression 1202 disposed on the upper surface thereof, having a rectangular contour. The first depression 1202 has a second depression 1204 disposed on the bottom surface thereof, having a perfectly circular contour smaller than the first depression 1202. Also, the first and second depressions 1202 and 1204 have a cut 1206 disposed on the bottom surfaces thereof, extending in the back-and-forth direction.

A rectangular, plate-like shaped disk cartridge storing a disk-shaped recording medium is placed on the first depression 1202, and a disk-shaped recording medium in a pair disk state is placed on the second depression 1204. In a state in which the tray 12 lies at the recording-and-playback position, the turntable 1802, the first and second pickups 20 and 22 face the lower surface of the disk-shaped recording medium through the cut 1206 of the tray 12.

As shown in FIGS. 2, 11, and 12, the tray 12 has an engagement 1208 disposed on the rear portion of the upper surface thereof and in the center with respect to the width direction thereof, having a protruding cam surface. The engagement 1208 has a longitudinal length substantially smaller than the radius of the disk-shaped recording medium.

As shown in FIG. 1, the upper plate 16 has a rectangular, plate-like shape extending longer in the back-and-forth direction than in the lateral direction.

When the upper plate 16 is inserted into an upper opening of the main body 14, and a hook 1408 of the main body 14 is inserted into a groove 1601 of the upper plate 16 so as to be positioned, the upper opening of the main body 14 is closed.

As shown in FIG. 6, the upper plate 16 has supports 1602 so that the disk cartridge is stably held by the tray 12 while being guided in the back-and-forth direction and an arm 24, both disposed therein.

The supports 1602 are respectively disposed in the left and right portions of the front and central portion of the upper plate 16 with respect to the back-and-forth direction.

Each support 1602 includes an arm 1604 disposed in a cut of the upper plate 16 so as to be vertically swingable with respect to a shaft 1603A; a roller 1612 disposed at the top of the arm 1604 so as to be rotatable; a coil spring 1603B urging the arm 1604 so as to be downwardly swingable; and a stopper disposed at the top of the arm 1604, determining a downward limit position, that is, a lower limit position of the arm 1604 upon abutting against the edge of the cut of the upper plate 16.

At the lower limit position of the arm 1604 at which the stopper abuts against the edge of the cut of the upper plate 16, the roller 1612 protrudes downward from the upper plate 16 and comes into contact with the upper surface of the disk cartridge so as to vertically hold the disk cartridge.

The upper plate 16 has an opening 1605 formed in the central portion thereof, extending in the back-and-forth direction and having the arm 24 disposed therein.

The upper plate 16 has a first abutting piece 1606 disposed so as to protrude from the front edge of the opening 1605. The first abutting piece 1606 has a cut 1607 formed therein. Also, the upper plate 16 has two second abutting pieces 1608 disposed so as to protrude from both sides of the central portion of the opening 1605 with respect to the longitudinal direction of the same, and each second abutting piece 1608 is formed such that the lower surface thereof is flush with a plane extending above the upper surface of the first abutting piece 1606, having a gap corresponding to the thickness of the arm 24 abutting against the foregoing upper surface, interposed therebetween.

In addition, the upper plate 16 has a connecting plate 1609 disposed in the opening 1605 in the back of the two second abutting pieces 1608, extending in the width direction thereof. The connecting plate 1609 has a fixing piece 1610 extending forward from the middle portion thereof with respect to the width direction thereof.

As shown in FIG. 7A, the arm 24 includes a main body 2402 formed of a thin plate and extending inside the opening 1605 in the back-and-forth direction. The main body 2402 has a fixed member 26, first and second springs 28 and 30, and so forth disposed thereto.

Also, the main body 2402 has an abutting piece 2404 formed at the front end thereof, abutting against the first abutting piece 1606. The abutting piece 2404 has a hole 2405 perforated in the top thereof so as to correspond to the cut 1607 of the main body 2402. In addition, the main body 2402 has abutments 2407 disposed on both sides of the middle portion thereof with respect to the back and forth direction so as to abut against the corresponding second abutting pieces 1608.

Furthermore, the main body 2402 has a round through-hole 2406 perforated in the front portion thereof and an opening 2408 perforated therein so as to extend rearward from the middle portion thereof with respect to the back-and-forth direction.

The first spring 28 is formed of a belt-shaped spring plate, includes a bent 2801; front and rear portions 2802 and 2804 connected each other with the bent 2801 interposed therebetween; and a retaining piece 2806 disposed at the rear end of the rear portion 2804. The front and rear portions 2802 and 2804 exhibit an inverse chevron shape in side view.

The front portion 2802 is fixed to the lower surface of a portion of the main body 2402 lying in front of the opening 2408. The rear portion 2804 is bent at the bent 2801, passes through the opening 2408, extends rearward so as to incline upward, and protrudes upward from the upper surface of the main body 2402.

The second spring 30 is formed of a belt-like spring plate, includes a bent 3001, front and rear portions 3002 and 3004 connected each other with the bent 3001 interposed therebetween, and an engagement 3006 disposed at the rear end of the rear portion 3004. The front and rear portions 3002 and 3004 exhibit an inverse chevron shape in side view.

The front portion 3002 is fixed to the lower surface of the rear end of the main body 2402. The rear portion 3004 is bent at the bent 3001 and extends rearward so as to decline downward gradually with respect to the main body 2402. The engagement 3006 is bent so as to exhibit a downwardly protruding bent shape.

The attracted member 26 is disposed to a synthetic resin holder 26A including a hollow shaft portion 2602 and upper and lower flanges 2604 and 2606 respectively disposed on and under the shaft portion 2602.

The shaft portion 2602 is formed so as to have a smaller diameter than that of the through-hole 2406 so that it is rotatable and vertically moveable in the through-hole 2406, while the upper and lower flanges 2604 and 2606 are formed so as to have larger diameters than that of the through-hole 2406.

As shown in FIG. 7B, the lower flange 2606 has a circular portion 2607 formed on the lower surface of the entire circumference thereof and a round hole 2609 formed in the center thereof.

The attracted member 26 is composed of a magnetic material attracted to a magnet, such as iron, is formed so as to have a disk shape, and is fixed to the lower end of the shaft portion 2602 so as to face downward through the round hole 2609.

Since the shaft portion 2602 is inserted through the through-hole 2406, the fixed member 26 is fixed to the arm 24 so as to be rotatable and also moveable together with the shaft portion 2602 in the axial direction of the shaft portion 2602, that is, vertically moveable within a range where the upper and lower flanges 2604 and 2606 abut against the corresponding edges of the through-hole 2406. Meanwhile, at least one of the upper and lower flanges 2604 and 2606 is detachably connected the shaft portion 2602 with any one of a variety of known mechanisms.

As shown in FIG. 1, the cover 17 includes an upper surface 1702 having a size so as to cover the upper opening of the main body 14 and side surfaces 1704 drooping from both side edges and the rear edge of the upper surface 1702.

The cover 17 is placed on the main body 14 having the upper plate 16 inserted in the upper opening thereof and is fixed to the main body 14 by screwing screws inserted in threaded through-holes 1706 of the side surfaces 1704 into corresponding threaded holes perforated in the side walls of the main body 14. The cover 17 has a cushion member disposed on the inner surface of the upper surface, extending along the four sides thereof. When the cover 17 is fixed to the main body 14, the cushion member comes into contact with the four sides of the upper surface of the upper plate 16, thereby preventing dust or the like from entering the main body 14.

Also, as shown in FIGS. 8 and 9, the cover 17 has a storing depression 1708 formed in the upper surface 1702, for storing the front portion of the arm 24 therein.

Assembly of the arm 24 will be described below.

As shown in FIG. 6, in a state in which the upper surface of the main body 2402 of the arm 24 faces the lower surface of the upper plate 16, the retaining piece 2806 is inserted through a hole 1611 perforated in the connecting plate 1609 from the below of the connecting plate 1609 and is retained to a portion of the upper surface of the same, defining the rear edge of the hole 1611. Then, in a state in which the upper surface of the rear portion 2804 of the first spring 28 lies in contact with the lower surface of the fixing piece 1610 of the upper plate 16, a pin is inserted through the hole 2405 of the main body 2402 and the cut 1607 of the upper plate 16 so as to position the main body 2402 and the upper plate 16. Subsequently, as shown in FIG. 7, a screw 2810 is screwed into a threaded hole perforated in the fixing piece 1610 from the lower surface of the rear portion 2804, while passing through a threaded through-hole 2808 perforated in the rear portion 2804. Thus, the lower surface of the fixing piece 1610 and the upper surface of the rear portion 2804 lie in contact with each other and are firmly fixed to each other, so that the arm 24 is fixed to the upper plate 16. Once the arm 24 is fixed to the upper plate 16 as described above, the pin is removed.

Also, as shown in FIG. 9, the upper plate 16 to which the main body 2402 is fixed is inserted into the main body 14 so as to cover the upper opening of the main body 14 and is fixed to the main body 14, having the cover 17 interposed therebetween.

An operation of the disk drive apparatus will be described below.

As described above, in a state in which the upper plate 16 is fixed to the main body 14, having the cover 17 interposed therebetween, the main body 2402 of the arm 24 extends in the back-and-forth direction in the opening 1605 in plan view and extends at an angle with respect to a horizontal plane in side view, due to a spring force of the bent 2801 of the first spring 28, and the front and rear portions of the main body 2402 protrude upward and downward from the upper surface of the upper plate 16, respectively, while extending through the opening 1605.

In the holder 26A, while the upper flange 2604 is engaged with the edge of the through-hole 2406, the lower flange 2606 protrudes downward from the main body 2402 and lies at a retracting position lying above the lower surface of the upper plate 16.

The engagement 3006 disposed at the rear end of the main body 2402 lies at a position on the moving path of the tray 12.

As shown in FIGS. 5, 10, and 11, when the tray 12 having a disk-shaped recording medium 2 in a pair disk state placed in the second depression 1204 moves from the protruding position to the recording-and-playback position, the engagement 3006 of the arm 24 and the engagement 1208 of the tray 12 are engaged with each other. Thus, the main body 2402 swings against an urging force of the first spring 28 such that the rear and front portions thereof are respectively positioned upward and downward with the bent 2801 as a fulcrum, and, in a state in which the tray 12 lies at the recording-and-playback position, a state in which the abutting piece 2404 of the main body 2402 abuts against the first abutting piece 1606 of the upper plate 16 and also the abutments 2407 of the main body 2402 abut against the lower surfaces of the corresponding second abutting pieces 1608 of the upper plate 16 is maintained so that the arm 24 is held parallel to the disk-shaped recording medium 2.

In this state, the attracted member 26 serves as the chucking position lying above a chucked portion of the disk-shaped recording medium 2.

When the turntable 1802 moves from the retracting position to the chucking position, the disk-shaped recording medium 2 is moved upward in a state the lower surface of the chucked portion thereof is placed on the turntable 1802. With this arrangement, since the attracted member 26 is attracted to the magnet of the turntable 1802, having the chucked portion interposed therebetween, the chucked portion of the disk-shaped recording medium 2 is sandwiched between the turntable 1802 and the attracted member 26. In this state, when the spindle motor 18 is driven to rotate the turntable 1802, the disk-shaped recording medium 2 is driven to rotate together with the attracted member 26 so as to have information recorded thereinto and/or played back therefrom by the first or second pickup 20 or 22 through the cut 1206.

When the tray 12 moves from the recording-and-playback position to the protruding position, the turntable 1802 moves from the chucking position to the retracting position, thus, the disk-shaped recording medium 2 is first moved downward in a state it is placed on the turntable 1802, and the turntable 1802 then moves away from the lower surface of the chucked portion.

Also, when the tray 12 moves from the recording-and-playback position to the protruding position, the engagement 3006 is disengaged from the engagement 1208 of the tray 12, thus causing the main body 2402 to swing such that the rear and front portions of the main body 2402 are positioned downward and upward due to the urging force of the first spring 28 with the bent 2801 as a fulcrum. In other words, when the tray 12 moves in the back-and-forth direction from the recording-and-playback position toward the protruding position by an amount corresponding to the length of the engagement 1208, the attracted member 26 serves as the retracting position retracting above the upper surface of the chucked portion of the disk-shaped recording medium, and the engagement 3006 disposed at the rear end of the main body 2402 returns to a state of lying at a position on the moving path of the tray 12.

Effects of the disk drive apparatus will be described below.

According to the present embodiment, even in the case where a disk cartridge lies outside the second depression 1204 in a state of being placed in the first depression 1202, since the lower flange 2606 lies at the retracting position, the lower flange 2606 is prevented from interfering with the disk cartridge, thereby allowing the disk cartridge to have one of a variety of shapes.

In place of the foregoing disk-shaped recording medium in a pair disk state, a first disk cartridge having the following example structure can be used.

As disclosed in, for example, International Publication No. WO 03/069620, the first disk cartridge includes a cartridge case having a perfectly round depression and a side edge portion extending along the circumferential edge of the depression. The first disk cartridge is formed such that a disk-shaped recording medium is stored in the depression in a state in which its recording surface is arranged so as to face the bottom surface of the depression and the other surface (label surface) opposed to the recording surface is exposed upward. In the first disk cartridge, sine the side edge portion extends above the upper surface of the disk-shaped recording medium stored in the depression, an upwardly-protruding circular projection is formed along the circumference of the disk-shaped recording medium.

In the case of the first disk cartridge having the above-described structure, since the tray 12 moves from the recording-and-playback position to the protruding position in a state in which the first disk cartridge is placed in the first depression 1202 of the tray 12, the lower flange 2606 serves as the retracting position, thereby preventing the lower flange 2606 from interfering with the circular depression.

Also, a second disk cartridge having the following example structure can be used.

As disclosed in, for example, International Publication No. WO 03/028030, the second disk cartridge includes a cartridge case having a rectangular plate-like shape. A disk-shaped recording medium is stored in the cartridge case, and the upper surface (label surface) of the disk-shaped recording medium is covered by the upper surface of the cartridge case. The chucked portion of the disk-shaped recording medium has an attracted plate built therein, composed of a magnetic material such as iron.

In the case of the second disk cartridge having the above-described structure, since the tray 12 moves from the protruding position to the recording-and-playback position in a state in which the second disk cartridge is placed in the first depression 1202 of the tray 12, the main body 2402 swings, and the lower surface of the lower flange 2606 is thus placed on the upper surface of the cartridge case. On this occasion, in the main body 2402, the edge of the through-hole 2406 lies between the upper and lower flanges 2604 and 2606 of the attracted member 26. Accordingly, since the holder 26A moves upward when the lower surface of the lower flange 2606 is placed on the upper surface of the cartridge, only a very small weight of the holder 26A and the attracted member 26 is exerted on the upper surface of the cartridge case, thereby preventing an adversely affecting load from exerting on the cartridge case and the disk-shaped recording medium stored in the cartridge case via the holder 26A.

Also, since the tray 12 moves from the recording-and-playback position to the protruding position in a state in which the second disk cartridge is placed in the first depression 1202 of the tray 12, the lower flange 2606 serves as the retracting position, thereby preventing the lower flange 2606 from interfering with the cartridge case.

Hence, a disk-shaped recording medium in a pair disk state, such as a CD, a CD-R, a DVD, or a DVD-R, or the foregoing first or second disk cartridge can be used without trouble.

Since the attracted member is constructed so as to be moveable between the retracting position retracting above the upper surface of the chucked portion of the disk-shaped recording medium and the chucking position facing the upper surface of the chucked portion in accordance with the swinging of the arm, no retracting space of the attracted member is needed in the direction along which the disk cartridge is loaded or unloaded, thereby advantageously making the apparatus compact.

Also, since the circular portion 2607 is formed along the entire circumference of the lower surface of the lower flange 2606, even when the circular portion 2607 comes into contact with a portion of the tray 12 or a portion of the cartridge case of the first or second disk cartridge, these portions are guided by the curved surface of the circular portion 2607, thereby preventing an excessive load from exerting on the attracted member 26, the tray 12, or the cartridge case.

In the present embodiment, although an arm-swinging mechanism for vertically swinging the arm 24 is formed by the first spring 28, the engagement 3006 of the arm 24, and the engagement 1208 of the tray 12, the arm-swinging mechanism is not limited to the structure described in the present embodiment. For example, it may have a structure including an actuator or a link mechanism. As described in the present embodiment, when the arm-swinging mechanism is formed by the first spring member 28, the arm 24, and the tray 12, the disk drive apparatus has advantages in a reduced number of components and a reduced cost.

Also, in the present embodiment, although an optical disk into or from which information is recorded and/or played back by illuminating a light beam with a pickup is used as a disk-shaped recording medium, the present invention is applicable to a disk drive apparatus which records information into and/or plays it back from a variety of disk-shaped recording media such as a magneto-optical disk, a magnetic disk, and an electrostatic disk by using a suitable pickup depending on each disk-shaped recording medium.

What is claimed is:

1. A disk drive apparatus, comprising:
    a casing;
    a tray on which a disk-shaped recording medium or a disk cartridge having a disk-shaped recording medium stored therein is placed and/or which moves between a recording-and-playback position drawn inside the casing and a protruding position withdrawn outside the casing;
    at least one pickup disposed in the casing, recording information into and/or playing it back from the disk-shaped recording medium when the tray lies at the recording-and/or-playback position; and
    a chucking mechanism disposed in the casing, holding a chucked portion of the disk-shaped recording medium when the tray lies at the recording-and/or-playback position, the chucking mechanism comprising:
        a turntable on which the chucked portion of the disk-shaped recording medium is placed and which has a magnet built therein; and
        an attracted member facing the upper surface of the disk-shaped recording medium and attracted by the magnet when the tray lies at the recording-and/or-playback position, the disk drive apparatus further comprising:
    a rotational driver disposed in the casing, rotationally driving the disk-shaped recording medium held by the chucking mechanism;
    an arm disposed to a portion of the casing above the tray lying at the recording-and/or-playback position so as to be vertically swingable, supporting and moving the attracted member between a retracting position retracting above the chucked portion and a chucking position at which the attracted member faces the chucked portion; and
    an arm-swinging mechanism which swings the arm so as to cause the attracted member to move to the retracting position when the tray moves from the recording-and/or-playback position to the protruding position and which swings the arm so as to cause the attracted member to move from the retracting position to the chucking position when the tray moves from the protruding position to the recording-and/or-playback position.

2. The disk drive apparatus according to claim 1,
wherein the arm extends between the recording-and/or-playback position and the protruding position in a direction along which the tray moves and is arranged such that both ends thereof with respect to the extending direction are disposed so as to be vertically swingable with the middle portion thereof as a fulcrum, with respect to the extending direction, and
wherein the attracted member is disposed at one end of the arm with respect to the extending direction.

3. The disk drive apparatus according to claim 1,
wherein the arm extends between the recording-and/or-playback position and the protruding position in a direction along which the tray moves, is arranged such that both ends thereof with respect to the extending direction are disposed so as to be vertically swingable with the middle portion thereof as a fulcrum, with respect to the extending direction, has a through-hole perforated in one end thereof with respect to the extending direction, and comprises a holder holding the attracted member,
wherein the holder comprises a shaft portion disposed in the through-hole so as to be moveable in the axial direction of the through-hole and rotatable about the axis of the through-hole; and flanges disposed at both ends of the shaft portion so as to have larger diameters than that of the through-hole, and
wherein the attracted member is disposed on the lower surface of one of the flanges facing the chucked portion.

4. The disk drive apparatus according to claim 1,
wherein the arm-swinging mechanism comprises a spring urging the arm so that the attracted member lies at the retracting position; and first and second engagements respectively disposed to the arm and the tray, and
wherein, when the tray moves from the recording-and/or-playback position to the protruding position, the first and second engagements are detached from each other so as to cause the arm to swing with an urging force of the spring, and to cause the attracted member to move from the chucking position to the retracting position, and, when the tray moves from the protruding position to the recording-and/or-playback position, the two engagements are engaged with each other so as to cause the arm to swing against the urging force of the spring and to cause the attracted member to move from the retracting position to the chucking position.

5. The disk drive apparatus according to claim 1,
wherein the arm extends between the recording-and/or-playback position and the protruding position in a direction along which the tray moves and is arranged such that both ends thereof with respect to the extending direction are disposed so as to be vertically swingable with the middle portion thereof as a fulcrum, with respect to the extending direction,
wherein the attracted member is disposed at one end of the arm with respect to the extending direction,
wherein the arm-swinging mechanism comprises a spring urging the arm so that the attracted member lies at the retracting position; and first and second engagements respectively disposed to the arm and the tray,
wherein, when the tray moves from the recording-and/or-playback position to the protruding position, the first and second engagements are detached from each other so as to cause the arm to swing with an urging force of the spring, and to cause the attracted member to move from the chucking position to the retracting position, and, when the tray moves from the protruding position to the recording-and/or-playback position, the two engagements are engaged with each other so as to cause the arm to swing against the urging force of the spring and to cause the attracted member to move from the retracting position to the chucking position,
wherein the tray has a length in a direction along which the tray moves, so as to be moveable between the recording-and/or-playback position and the protruding position, and
wherein the first engagement is disposed at the other end of the arm with respect to the extending direction, and the second engagement is disposed at the end of the tray close to the recording-and/or-playback position, with respect to the longitudinal direction of the tray.

* * * * *